May 16, 1961 R. C. RUSSELL ET AL 2,984,064
TIMER DEVICE
Filed Sept. 4, 1958

INVENTORS
Charles B. McDonald
Robert C. Russell

Charles B. McDonald
agent

United States Patent Office 2,984,064
Patented May 16, 1961

2,984,064

TIMER DEVICE

Robert C. Russell, 3685 Glencairn St., and Charles B. McDonald, 3456 Colton St., both of Shaker Heights, Ohio Filed Sept. 4, 1958, Ser. No. 759,022

3 Claims. (Cl. 58—144)

This invention relates to a novel timer device and more particularly to improvements to the timer device disclosed in copending application of Robert C. Russell, Serial Number 690,943 filed October 18, 1957 for Timer Device, and now abandoned.

This invention utilizes as a means of movement a visible air bubble time indicator carried upon a column of viscous fluid such as Dow Corning 200 fluid silicone oil sealed within a cylindrical elongated cavity supported by a base having two support surfaces which extend in converging relationship away from the cavity and which are each disposed in a manner to be inclined relative to the cavity to provide right and left hand predetermined support structure for the base which may be employed to dispose the cavity in a plurality of selectable positions wherein the cavity will be inclined relative to a vertical plane which passes laterally through the cavity. When said base is tilted in its right hand position the air bubble will travel toward the elevated end of the cavity at a predetermined speed for a predetermined distance in the desired length of time, and vice versa when the base is tilted to its opposite angular position.

The viscosity of said Dow Corning 200 fluid silicone oil remains nearly constant at normal temperatures ordinarily encountered in living quarters and offices, however we discovered at higher temperatures it is possible that the viscosity may change sufficiently to effect the time cycle of the air bubble. We found that this could be corrected by properly proportioning the size of the air bubble to the volume of the fluid in the cavity since the expansion of a plastic base is negligible compared to the expansion of the fluid, therefore the air in the bubble is compressed and the bubble automatically becomes smaller and compensates for the change in viscosity at higher temperatures and will provide an accurate time cycle through a comparatively wide temperature range.

The size of the air bubble is critical. To obtain accurate timing we discovered that the size of the bubble can be accurately established by completely filling the cavity with the fluid and providing a sealing cap with a recess which is longitudinally aligned with the cavity and of a depth for the correct amount of air for the exact required size of the air bubble. The time cycle is determined by the viscosity of the fluid, the size of the air bubble, the inside diameter, length and angularity of the cavity.

One of the objects of this invention is to provide an accurate timer device employing a viscous fluid and an air bubble time indicator means of the correct size which automatically compensates and corrects the time of travel of the air bubble time indicator through a wide temperature range.

Another object of this invention is to provide an accurate timer device having ornamental and attractive appearance and utility.

Another object of this invention is to provide a timer device that requires no close tolerances or adjustment to regulate the time cycle.

Other objects, advantages and important features of the invention will be apparent from a study of the specification following, taken with the drawing, which together describe, disclose and illustrate an embodiment of the invention and what is now considered and believed to be the best mode of practicing the principles thereof. Still other embodiments may be suggested to those having the benefit of the teachings herein, and such other embodiments are intended to be reserved especially as they fall within the scope and breadth of the subjoined claims.

Figure 1:
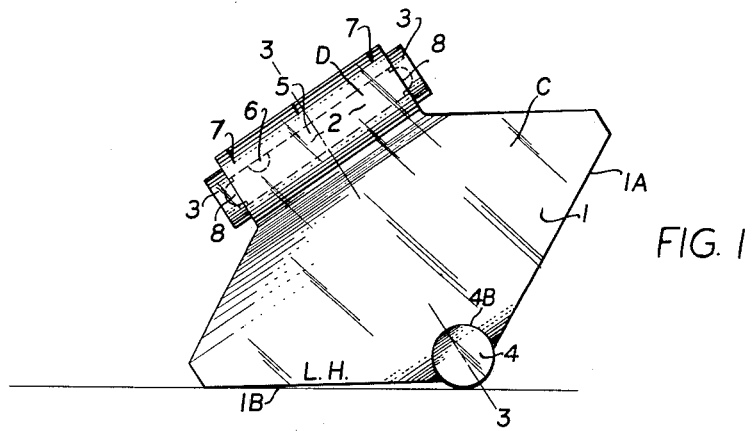
Figure 1 is a side elevational view of a timer device having the novel features of this invention incorporated therein and illustrating the timer device as being disposed in a left hand operational position.
Figure 2:
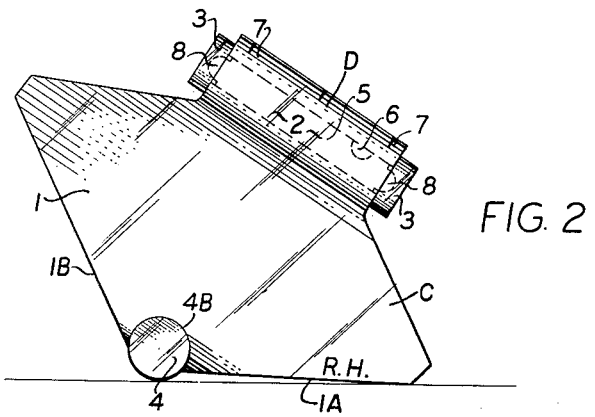
Figure 2 is a side elevational view of a timer device similar to Fig. 1, but differing therefrom by illustrating the timer device as being disposed in a second or right hand operational position.

Attention is now directed to the drawing wherein there is illustrated a timer device which includes a body member 1, preferably formed of a suitable plastic or other type of similar material, having a cylindrical portion D which defines an elongated open ended cavity 2 and a portion C which defines support structure for supporting the body member 1 in a left hand position, as shown in Fig. 1, and a right hand position, as illustrated in Fig. 2.

It is to be noted that the supporting structure of the portion C includes a pair of surfaces 1A and 1B which extend along the bottom part of the portion C and converge toward each other in a direction which is away from the cavity 2 with the surfaces 1A and 1B of the support structure being in respective planes that are each inclined relative to a substantially horizontal plane which passes longitudinally through the cavity 2.

Figure 3:
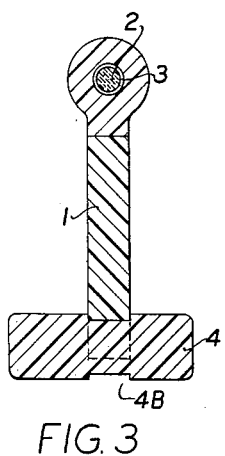
Figure 3 is an enlarged cross sectional view taken along the line 3—3 of Fig. 1 looking in the direction of the arrows.

Further, the surfaces 1A and 1B are joined at a location which is remote from the cavity 2 whereat means 4, such as a pin or the like, is provided for tilting or pivoting the body member 1 between the left and right hand positions with at least a portion of the surfaces 1A and 1B defining means for engaging a support at a location thereon which is spaced from the means 4 to maintain the body member 1 in the desired selected left or right hand inclined position, as mentioned above. If desired, the pivot pin 4 may be provided with an undercut 4B, as shown in Fig. 3, to facilitate in the assembly of the timer device.

Figure 4:
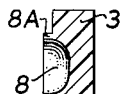
Figure 4 is a cross sectional view of a closure for closing an open end of a cavity.
Figure 5:
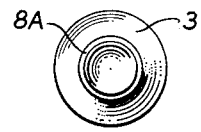
Figure 5 is an elevational view of the closure illustrated in Fig. 4.

Closure means 3 in the form of a cap, as illustrated in Figs. 4 and 5, having a recess 8 therein is provided for closing an open end of the cavity 2 and the recess 8, in the cap 3, is disposed therein so as to be longitudinally aligned with the cavity 2 and of such size as to establish a visible gas bubble 6 which is correctly proportional to the volume of a viscous fluid 5, such as for example "Dow Corning Silicon Fluid No. 200" which may be sealed and contained within the cavity 2 so as to compensate for any change in the viscosity of the fluid 5 at elevated or higher temperatures and maintain the accuracy of the timer device. A peripheral projection 8A may be provided for the cap 3 which facilities in the securement of the cap 3 to the cylindrical portion D of the body member 1 so that the projection 3A is received within the cavity 2.

In this manner, by reason of the disposition of the cavity 2 relative to the vertical, the supporting structure defined by the portion C, the type of fluid 5 employed and the size of the recess 8 relative to the size of the cavity 2 and volume of the fluid 5, it is possible to accurately establish, control, maintain and compensate, as desired, for the travel of the gas bubble 6 through the fluid 5 so that the bubble 6 will pass therethrough at a predetermined speed and indicate the elapse of a given time interval and graduations 7 may be applied to the cylindrical portion D of the body member 1 to indicate the time travel of the visible gas bubble 6 at a selected desired time interval.

In operation, as illustrated in Figs. 1 and 2 of the drawing, the timer device is positioned by reason of the pivot pin 4 with the selected surface 1A or 1B having at least a portion thereof in engagement with some type of a support such as a table, desk or the like, not illustrated, with the cavity 2 being disposed, in each instance, in a position which is inclined to a vertical plane that passes laterally through the cavity so that the visible gas bubble 6 may pass from the lower end portion of the cavity to the upper end portion thereof through the viscous fluid 5 at the desired predetermined speed to indicate the elapse of the desired time interval.

While a certain specific embodiment of this invention has been disclosed in the foregoing description it will be understood that various modifications within the spirit of the invention may occur to those skilled in the art.

What we claim is:

1. A timer device including a body member having an elongated open ended cavity therein, a viscous fluid within said cavity, a closure for closing an open end of said cavity, said closure having a recess substantially longitudinally aligned with said cavity to define a visible gas bubble within the fluid for indicating the passage of a given time interval, and support structure including a pair of surfaces inclined relative to the cavity and extending in converging relationship relative to each other in a direction away from the cavity for tiltably mounting said body member to dispose the cavity in selectable positions which are inclined to a vertical plane that passes laterally through the cavity to enable the gas bubble to move at a predetermined speed through the fluid when the cavity is disposed in a selected one of the inclined positions from the lower end portion of the cavity to the upper end portion thereof.

2. The timer device as set forth in claim 1 wherein at least a portion of said surfaces defines means for engaging a support to maintain the cavity disposed in the selected inclined position.

3. The timer device as set forth in claim 1 wherein said surfaces are joined at a location remote from the cavity to define means for enabling the body member to be tilted to dispose the cavity in the selected inclined position.

References Cited in the file of this patent

UNITED STATES PATENTS

| | | |
|---|---|---|
| 771,803 | Bishop | Oct. 11, 1904 |
| 1,224,142 | Collins | May 1, 1917 |
| 2,234,437 | Kistler | Mar. 11, 1941 |
| 2,288,813 | Long | July 7, 1942 |
| 2,714,927 | Stern et al. | Aug. 9, 1955 |
| 2,806,296 | Weichert | Sept. 17, 1957 |

FOREIGN PATENTS

| | | |
|---|---|---|
| 94,115 | Sweden | Jan. 9, 1939 |
| 589,384 | France | Feb. 20, 1925 |
| 655,598 | Great Britain | July 25, 1951 |